United States Patent [19]
Fleischhauer

[11] 3,731,789
[45] May 8, 1973

[54] CONVEYOR FOR DOCUMENTS

[75] Inventor: Eugene T. Fleischhauer, Charlottesville, Va.

[73] Assignee: Acme Visible Records, Inc., Crozet, Va.

[22] Filed: Dec. 9, 1971

[21] Appl. No.: 206,308

Related U.S. Application Data

[63] Continuation-in-part of Ser. No. 873,472, Nov. 3, 1969, abandoned.

[52] U.S. Cl. ............................ 198/160, 198/DIG. 16
[51] Int. Cl. ........................................... B65g 15/00
[58] Field of Search .................. 198/160, 162, 165, 198/DIG. 16; 271/DIG. 2

[56] References Cited

UNITED STATES PATENTS

| | | | |
|---|---|---|---|
| 2,167,818 | 8/1939 | Wagner | 198/160 |
| 3,674,160 | 4/1971 | Gutowski | 198/160 |
| 3,100,564 | 8/1963 | Levy | 198/165 |
| 2,184,229 | 12/1939 | Spiess | 271/DIG. 2 |

FOREIGN PATENTS OR APPLICATIONS

| | | | |
|---|---|---|---|
| 988,106 | 8/1951 | France | 198/160 |
| 425,409 | 2/1926 | Germany | 198/165 |

*Primary Examiner*—Richard E. Aegerter
*Attorney*—Lee J. Gary et al.

[57] ABSTRACT

A conveyor for articles of various thicknesses includes a continuous conveyor belt driven around spaced rollers and a stationary housing that encloses the belt. Spaced groups of brushes or bristles are secured on the outwardly facing surface of the belt such that the ends of the bristles may slide across an opposed surface of the housing. The bristles are inclined toward the direction of travel or conveyance of the belt in order to catch the edges of the conveyed article and impart a positive thrust to the articles within the conveyor. The flexibility of the bristles allows for the accommodation of articles of various sizes and thicknesses and minimizes damage to the conveyor or article in the event of jam up.

7 Claims, 8 Drawing Figures

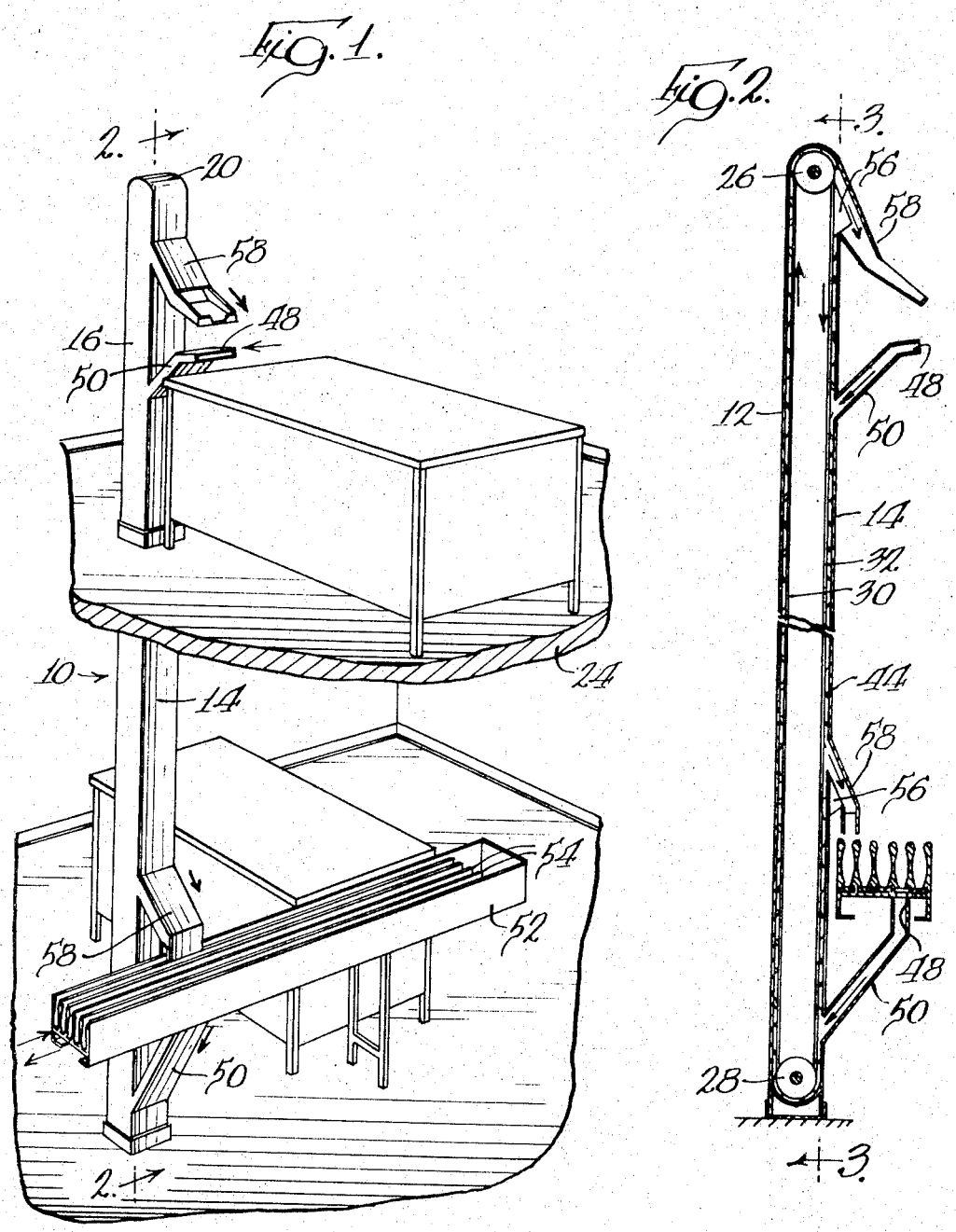

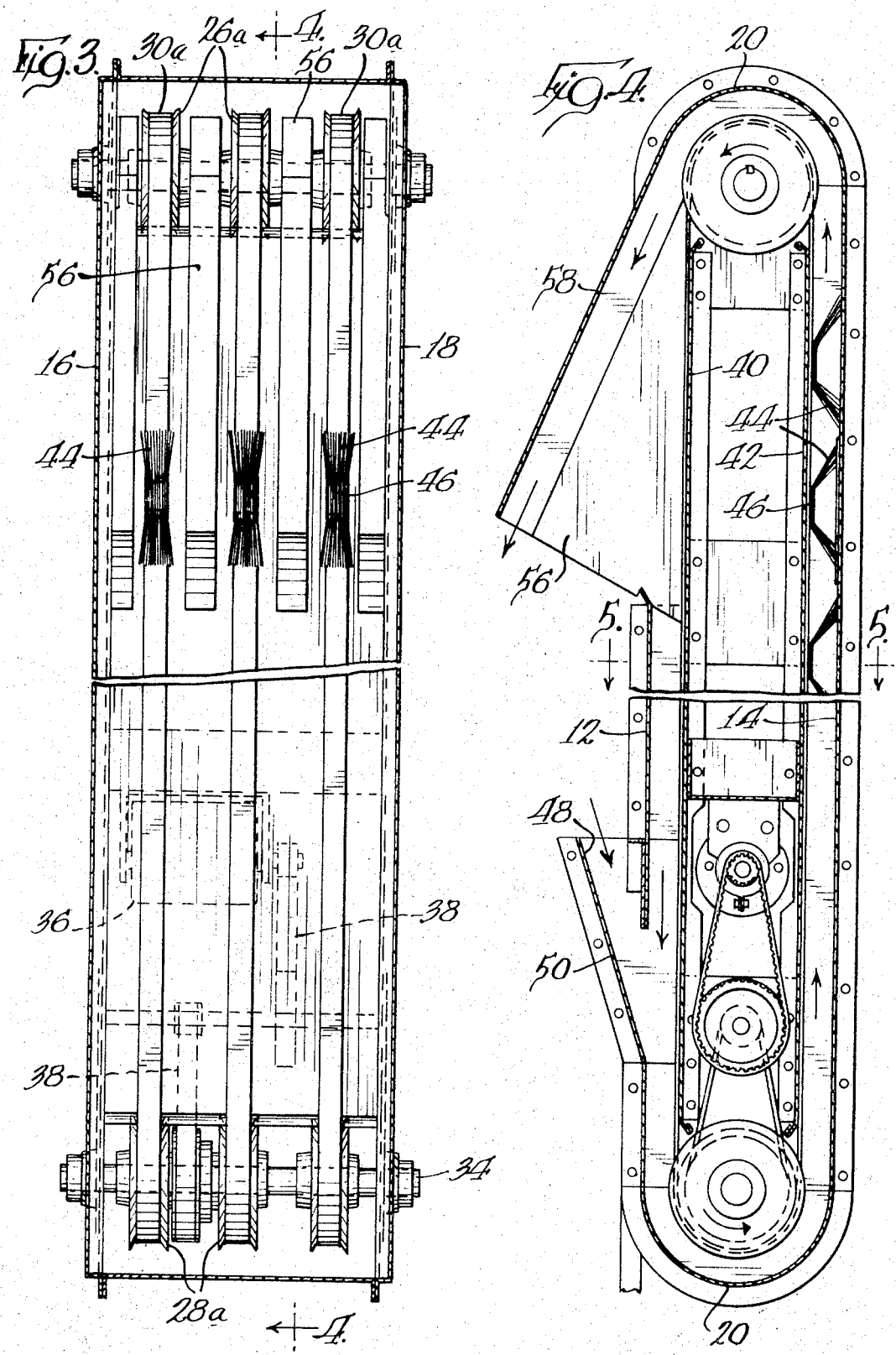

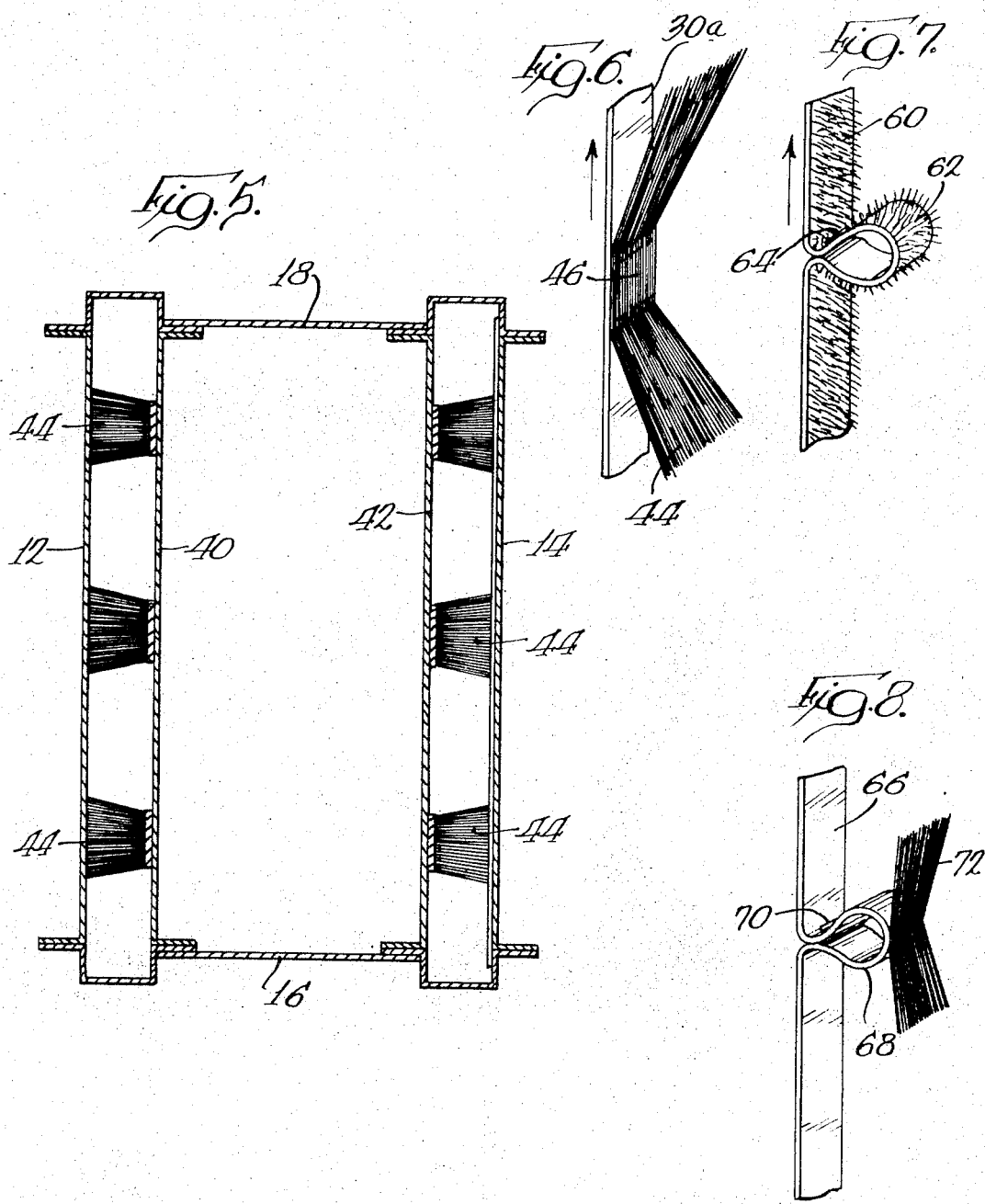

CONVEYOR FOR DOCUMENTS

CROSS REFERENCE

This application is a continuation-in-part of my copending application Ser. No. 873,472, filed Nov. 3, 1969, now abandoned.

BACKGROUND OF THE INVENTION

This invention relates to conveyors and more particularly to conveyors that are capable of transporting articles, especially documents, of various weights, thicknesses and shapes in vertical directions between sending and receiving stations.

Under circumstances in which large numbers of documents or files are handled within a confined space, it is desirable or necessary to provide the ability for moving such materials vertically, such as between various floors of a building, in a rapid manner and without danger of mutilation. In some cases, files or other individual documents may be transported in large groups in an elevator. In other cases, it is desirable to convey each document separately and individually, in order to avoid sorting of large numbers of documents and to eliminate the time losses inherent in bulk transportation.

Very few conveyors are known that are specifically adapted to convey individual documents of various thicknesses in generally vertical directions. One type of apparatus that has been employed for this purpose is a "drag" type conveyor illustrated in the patent to Wagner U.S. Pat. No. 2,167,818 and Needham U.S. Pat. No. 2,028,236. Conveyors of this type operate primarily by means of friction between the conveyor belt and the article to be conveyed. For example, the device shown in the aforesaid Wagner patent comprises a belt having short perpendicular projections that frictionally engage and pull sheet materials disposed between the projections and an opposed wall of the conveyor housing.

The "drag" type of conveyors described above are subject to various difficulties. First, the distance between the belt surface and the opposed wall of the conveyor housing is critical and must be adjusted to prevent slippage of the article in the conveyor. Second, sufficient dragging forces may not be available to convey heavier articles. Third, since considerable friction is generated on the conveyed article due to the forces necessarily exerted on the article against the housing wall, mutilation or other damage to the article may become a serious problem, especially in the case of heavier articles or articles having relatively great thicknesses. For example, the raised indica of plastic charge plates might be seriously worn because of excessive friction in a drag type conveyor.

SUMMARY OF THE INVENTION

The present invention provides a conveying apparatus that is extremely versatile and avoids the problem of the art mentioned above. A moving conveyor belt is provided with inclined flexible bristles that contact the opposed surface of the conveyor housing. The flexible bristles are inclined generally in the direction of travel of the belt so as to (i) engage the lower edge of an article in the conveyor during ascent and thereby provide a positive pushing force on the article and (ii) otherwise engage the surface of the article and provide a positive thrust thereto.

The surface of the housing opposed to the bristled surface of the belt is disposed parallel and substantially coextensive with the belt in a fixed distance relationship, such that the ends of the bristles contact the surface and catch and convey the thinnest sheets placed in the conveyor. At the same time, the flexibility of the bristles allows for the accommodation of articles of much greater thicknesses and weights without imposing significantly greater friction on the surface of the article and without hindering the efficiency of the conveyor.

THE DRAWINGS

FIG. 1 is a diagrammatic perspective view of the conveyor of the present invention adapted to convey documents and the like between vertically spaced levels and being shown in combination with a separate horizontal conveyor;

FIG. 2 is a vertical sectional view of the conveyor taken substantially along line 2—2 of FIG. 1;

FIG. 3 is a detailed sectional view of the conveyor taken along section line 3—3 of FIG. 2;

FIG. 4 is a detailed sectional view of the conveyor taken along section line 4—4 of FIG. 3;

FIG. 5 is a transverse sectional view taken along section line 5—5 of FIG. 4;

FIG. 6 is a fragmentary perspective view of the conveyor belt of the present invention, illustrating a preferred manner of securing flexible bristles thereto; and FIGS. 7 and 8 are views similar to FIG. 6 illustrating alternate forms of belts and bristles.

DETAILED DESCRIPTION OF THE PREFERRED EMBODIMENT

The present invention generally comprises a conveyor particularly capable of moving documents in ascending and descending directions and in a continuous loop. It will be understood that the term "document" is employed herein in the general sense to include generally flat sheets of any material, such as plastic or fiber, as well as groups of sheets associated together, and may include one or more sheets of paper, cards, files, envelopes, and other similar articles ranging in thickness from that of the finest tissue up to approximately one-half of an inch and greater.

As shown in the Figures, the conveyor, generally indicated at 10, comprises an elongated rectangular housing made up of a pair of spaced outer walls 12 and 14 connected by respective side walls 16 and 18 and having upper and lower arcuate portions 20 enclosing the ends. As shown in FIG. 1, the conveyor may extend vertically from a lower floor 22 through an upper floor 24 to enable the conveyance of documents between floors.

As shown in FIG. 2, respective upper and lower pulleys or rollers 26 and 28 are rotatably mounted in the respective ends of the conveyor housing, and an endless belt 30 having an outwardly facing surface 32 is looped around and stretched between said rollers so as to be movable upon rotation thereof within said housing. As shown in FIG. 3, the rollers 26 and 28 may take the form of respective pluralities of vertically aligned pulleys 26a and 28a carrying respective spaced parallel belts 30a. The lower rollers or pulleys are preferably secured on a shaft 34 rotatably mounted in the housing and driven by a motor 36 connected to the shaft by belts 38 or other suitable means (FIGS. 3 and 4). As shown in FIGS. 2 and 4, a pair of spaced parallel inner walls 40 and 42 are secured within the housing and extend between the rollers or pulleys 26 and 28 substantially tangential therewith, such that the opposite vertical runs of the conveyor belt are supported thereby.

The construction of the conveyor is such that the vertical runs of the belt 30 are substantially parallel to and spaced from the outer walls 12 and 14 of the housing, with the same parallel spaced relationship being maintained at the curved end portions 20. In this manner, a continuous enclosed space is defined between the belt and the walls of the housing within which documents may be conveyed.

As shown in FIGS. 2-6, a plurality of spaced groups or tufts of bristles 44 are secured to the outer surface 32 of the belt 30 and project outwardly therefrom toward the outer walls 12 and 14 of the housing. The bristles, or at least a portion thereof, are preferably arranged in a parallel relationship with respect to each other and with respect to the side edges of the belt and are inclined toward the direction of travel of the belt. Preferably, the bristles extend across substantially the entire width of the belt, and the free ends of the bristles are slidably engaged with or contact one of the outer walls 12 and 14 of the housing or with a curved end portion 20 thereof. In this manner, the ends of the bristles 44 will engage with and push a document inserted in the conveying space, as will be hereinafter more fully explained.

In order to allow the conveyor to operate in either direction, the flexible bristles may be arranged to project toward both possible directions of travel. Thus, as shown, a group of bristles of substantially the same length may be bound together intermediate their ends by a suitable retainer 46, and the retainer may be secured to the belt in any convenient manner. The retainer 46 is preferably bent outward at the longitudinal ends thereof such that the bristles will project outwardly on an angle at both ends or in a V-shaped configuration with respect to the belt. The groups of bristles in V-shaped formation are spaced around the entire circumference of the belt such that the ends of adjacent groups are closely spaced and form a continuous or semi-continuous conveying medium.

Means are provided for inserting documents into the conveyor and for removing documents from the conveyor at any desired location. As shown in FIGS. 1-4, an inlet 48 comprising an open transverse slot in either of the outer walls 12 and 14 may be provided, to which a downwardly inclined chute 50 may be connected, with the slot and the chute being of approximately the same width as the conveyor housing. As shown in FIG. 1, the chute 50 may be fed by hand or may be fed by a secondary conveyor 52 having a plurality of conveying channels 54, one of which has an exit that opens downwardly to the chute.

The means for removing documents from the conveyor may comprise one or more stripper fingers 56 having one edge thereof disposed closely to the surface of the belt and being outwardly inclined therefrom into an exit chute 58. As shown in FIG. 3, in the case where a plurality of belts are employed, the strippers 56 may extend into the spaces between adjacent belts so as not to interfere with the movement of the bristles. As shown in FIG. 1, the exit chute 58 may lead to a secondary horizontal conveyor 52 into a channel thereof separate from that connected to the inlet.

FIGS. 7 and 8 illustrate alternate forms of belts having bristles. As shown in FIG. 7, the entire outer surface of the belt may comprise bristled fabric 60, with spaced loops 62 being formed in the material of the belt by means of a staple 64 or other suitable retainer at the base of the loop.

As shown in FIG. 8, the surface of the belt 66 may be devoid of fabric and may comprise loops 68 secured by a retainer 70 and having V-shaped groups of bristles 72 secured to the outermost portion of the loop.

In operation, the motor 36 is energized, causing movement of the belt around the rollers. A document inserted into the inlet 48 will be caught and pushed along by the bristles 44 around the circumference of the conveyor until an exit 58 is encountered. During ascent or other times when the conveyor is working against gravity, the ends of the bristles of one group engage the lowermost edge of the document and positively push the document upwardly in the conveyor; at the same time, the bristles of one or more of the groups located above said one group engage the surface of the document, thereby holding the document flush against the outer walls while applying a positive thrust or tractive force thereto.

An important feature of the present invention is the manner in which the bristles are mounted on the belt. Mounting of the bristles on an incline toward the direction of travel of the belt causes a positive thrust to be transferred from the belt directly to the document. In this manner, excessive friction between the document and the outer wall is not created, as might be the case with belts having perpindicular tractive projections.

An additional important feature is the ability of the conveyor to accommodate various documents having a wide range of widths and sizes. A thin document will cause substantially no deflection of the bristles, whereas a thick document is accommodated by some deflection of the bristles toward the belt. It should also be noted that both thick and thin documents may be carried in the conveyor at the same time without disrupting the operation of the conveyor.

Another important feature is the accommodation of jamming of the conveyor. In the case of most conveyors, jamming may cause damage to the conveyor as well as the conveyed article if the conveyor is not immediately stopped. In the present invention, jamming of a document in the conveyor presents no serious problems because the flexible bristles can pass by the jammed article until corrective measures are taken.

During descent of a document in the conveyor, it will be understood that movement of the document is assisted by gravity and hence the article may not be firmly engaged at its edges by the bristles. At the same time, however, the bristles serve to prevent the document from falling in the conveyor and maintain the document at a fixed distance from other documents in the conveyor.

Having thus described the invention, what is claimed is:

1. A conveyor for documents and the like comprising continuous belt means having an outwardly facing surface, means for driving said belt means, a wall spaced from said belt means, and spaced groups of bristles projecting from said belt means and substantially contacting said wall, said bristles being medially secured to said belt means with the ends thereof extending in opposite directions in a V-shaped configuration.

2. The conveyor of claim 1 wherein said belt means comprises a plurality of spaced belts substantially equispaced from said wall.

3. The conveyor of claim 2 wherein stripper means is provided between adjacent belts of said plurality of belts for removing documents from said conveyor.

4. The conveyor of claim 1 wherein means are provided for introducing documents between said belt means and said wall, and means are provided for removing documents from between said belt means and said wall.

5. The conveyor of claim 1 wherein said belt means comprises spaced groups of loops, each of said loops carrying said bristles.

6. The conveyor of claim 1 wherein said belt is looped at its longitudinal extremes and wherein said wall is curved at said extremes in conformity with said belt.

7. A conveyor for documents and the like of various thicknesses comprising a continuous belt arranged substantially vertically and having an outwardly facing surface, means for driving said belt, a housing around said belt comprising an outer stationary wall spaced from the outwardly facing surface of said belt, vertically spaced tufts of bristle-like material medially secured to said belt and projecting therefrom toward said wall in a V-shaped configuration with the outer ends thereof flexibly contacting said wall in frictional engagement therewith, the bristles of one tuft being positively engageable with the lower edge of a document and the bristles of the tufts thereabove being flexibly engageable with the portions of the document above its lower edge and the flexibility of said tufts accommodating documents of various thicknesses and permitting said tufts to pass over sheet materials in the event of a jam up within said conveyor, and vertically spaced inlet and outlet openings in said outer wall for insertion of documents of various thicknesses between said belt and said wall and for the delivery of the documents therefrom at a vertically spaced location.

* * * * *